P. H. Oliver.
Making Gunpowder.
N°76,510.  Patented Apr. 7, 1868.
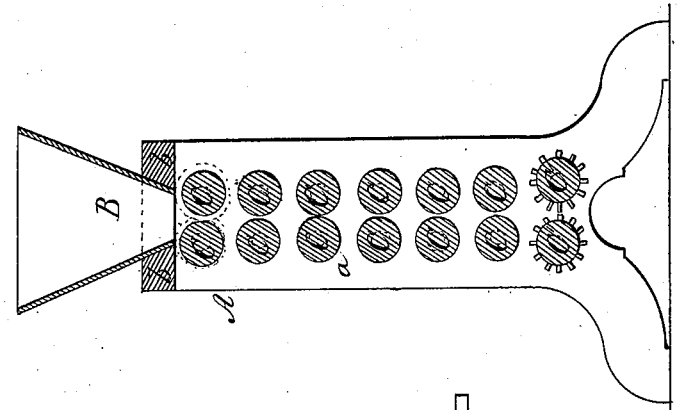
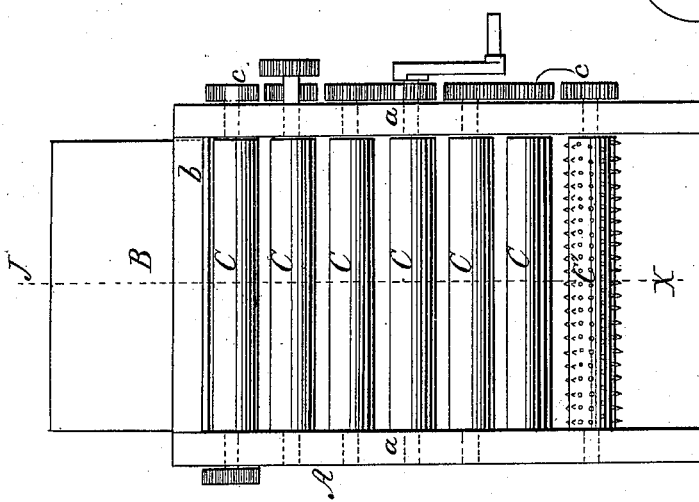
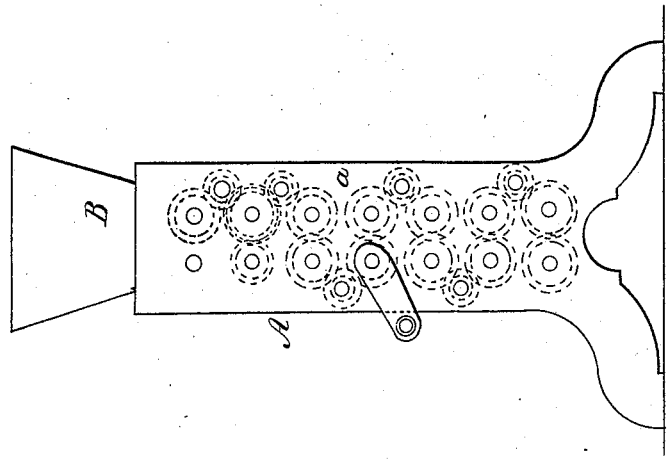
Witnesses:
H. C. Ashkettle
Wm A Morgan
Inventor:
Paul A. Oliver

United States Patent Office.

PAUL A. OLIVER, OF NEW YORK, N. Y.

Letters Patent No. 76,510, dated April 7, 1868.

IMPROVED MACHINERY FOR THE MANUFACTURE OF GUNPOWDER.

*The Schedule referred to in these Letters Patent and making part of the same.*

TO ALL WHOM IT MAY CONCERN:

Be it known that I, PAUL A. OLIVER, of the city, county, and State of New York, have invented a new and useful Improvement in Machinery for the Manufacture of Gunpowder; and I do hereby declare that the following is a full, clear, and exact description thereof, which will enable those skilled in the art to make and use the same, reference being had to the accompanying drawings, forming part of this specification.

This invention relates to a new and improved machine for combining and incorporating the ingredients of which gunpowder is composed, and also for granulating or separating into small lumps the mass of powder compressed in caky form by the combining and incorporating of the ingredients.

The object of the invention is to obtain an economical device, whereby the above result may be obtained within a comparatively small compass, and one which will be continuous in its operation, the present Chilian mill, which is now used for the purpose, being very cumbersome and expensive, and not continuous in its operation. In the accompanying sheet of drawings—

Figure 1 is a side view of my invention.

Figure 2, a front view of the same.

Figure 3, a vertical section of the same, taken in the line $x\ x$, fig. 2.

Similar letters of reference indicate corresponding parts.

A represents a frame, composed of two uprights, $a\ a$, connected at their upper ends by cross-pieces $b\ b$, between which the lower part of a hopper, B, is fitted.

C represents a series of rollers, which are arranged in pairs in the frame A, one pair above the other, the axes of each pair being in a horizontal plane, as shown clearly in fig. 3.

These several pairs of rollers are connected at one end by gears, $c$, as shown in fig. 2, and in red outline in fig. 1.

I design in practice to have the journals of one roller of each pair fitted in adjustable bearings, so that the space between each pair of rollers may be varied in width, as desired; and I further design to have one or more of the upper pairs of rollers so geared that one roller will have a rather greater speed than the other.

The same result may be obtained by having one roller rather greater in diameter than the other.

By this means the rollers thus arranged will have a rubbing or grinding as well as a crushing or compressing action.

The lower pair of rollers, designated by $C'$, is provided with teeth $c$.

The ingredients, sulphur, saltpetre, and charcoal, are pulverized, mixed, and water added to them as usual, and put into the hopper B, from which they pass down between the several pairs of rollers C, and thereby crushed and ground, and the different ingredients thoroughly incorporated together.

The moist ingredients, in consequence of being thus crushed and ground and incorporated together, will be discharged from the lower pair of rollers C in a caky mass, and the office of the rollers $C'$ is to break this caky mass into small lumps, which they perform in the most efficient manner.

The device now used for crushing and incorporating the ingredients of which gunpowder is composed, consists of heavy rollers, arranged so as to rebate on a bed-plate.

It is substantially the old Chilian mill, and is extremely cumbersome, as the required pressure is obtained by the gravity of the rollers only.

Besides this disadvantage, the operation of this device is not continuous, as a quantity of the ingredients must be placed on the bed-plate, and after being crushed and incorporated together, require to be removed and another quantity of ingredients placed on the bed-plate, the device, of course, being stopped in the mean time.

By my improvement it will be seen that the operation is a continuous one, the device not requiring to be stopped for any cause, and working continually, so long as the ingredients are fed into its upper end. And it will further be seen that any required pressure may be obtained, by adjusting the rollers nearer together or further apart.

I do not confine myself to any precise number of pairs of rollers, for more or less may be used, as circumstances require.

I claim as new, and desire to secure by Letters Patent—

A machine for crushing, grinding, and incorporating together the ingredients for the manufacture of gunpowder, composed of a series of rollers, placed in pairs, one pair above another, and a lower pair, one or more, of toothed rollers, all arranged to operate substantially as shown and described.

PAUL A. OLIVER.

Witnesses:
  Wm. F. McNamara,
  Alex. F. Roberts.